(12) United States Patent
Kim et al.

(10) Patent No.: US 8,930,436 B2
(45) Date of Patent: Jan. 6, 2015

(54) APPARATUS AND METHOD OF DYNAMICALLY DISTRIBUTING LOAD IN MULTIPLE CORES

(75) Inventors: Min Soo Kim, Yongin-si (KR); Shi Hwa Lee, Seoul (KR); Do Hyung Kim, Hwaseong-si (KR); Joon Ho Song, Hwaseong-si (KR); Sang Jo Lee, Suwon-si (KR); Won Chang Lee, Seongnam-si (KR); Doo Hyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 684 days.

(21) Appl. No.: 12/923,758

(22) Filed: Oct. 6, 2010

(65) Prior Publication Data

US 2011/0247006 A1    Oct. 6, 2011

(30) Foreign Application Priority Data

Mar. 31, 2010    (KR) .................. 10-2010-0029403

(51) Int. Cl.
*G06F 15/16* (2006.01)
*G06F 9/50* (2006.01)

(52) U.S. Cl.
CPC .............. *G06F 9/505* (2013.01); *G06F 9/5033* (2013.01); *G06F 2206/1012* (2013.01); *G06F 2206/1508* (2013.01); *G05B 2219/33334* (2013.01)
USPC .............. 709/201; 711/147; 712/28; 709/202

(58) Field of Classification Search
CPC ............. G05B 2219/33334; G06F 2206/1508; G06F 2206/1012; G06F 9/505; G06F 9/5033
USPC ........................................................ 709/201
See application file for complete search history.

(56) References Cited

U.S. PATENT DOCUMENTS 7,634,637 B1 * 12/2009 Lindholm et al. .............. 712/22
2005/0041031 A1 * 2/2005 Diard ............................ 345/505

FOREIGN PATENT DOCUMENTS

| JP | 2008-191949 | 8/2008 |
|---|---|---|
| JP | 2009-93383 | 4/2009 |
| KR | 10-2008-0041047 | 5/2008 |
| KR | 10-2009-0020460 | 2/2009 |

* cited by examiner

*Primary Examiner* — Jude Jean Gilles
*Assistant Examiner* — Jaren M. Means
(74) *Attorney, Agent, or Firm* — Staas & Halsey LLP

(57) ABSTRACT

Provided is an apparatus and method of dynamically distributing load occurring in multiple cores that may determine a corresponding core to perform functions constituting an application program, thereby enhancing the entire processing rate.

11 Claims, 4 Drawing Sheets

APPARATUS AND METHOD OF DYNAMICALLY DISTRIBUTING LOAD IN MULTIPLE CORES

CROSS-REFERENCE TO RELATED APPLICATIONS

This application claims the priority benefit of Korean Patent Application No. 10-2010-0029403, filed on Mar. 31, 2010, in the Korean Intellectual Property Office, the disclosure of which is incorporated herein by reference.

BACKGROUND

1. Field

One or more embodiments relate to an apparatus and method of dynamically distributing load occurring in multiple cores that may determine a corresponding core to perform functions constituting an application program, thereby enhancing the entire processing rate.

2. Description of the Related Art

Due to limitation of a clock improvement and a power issue, an existing single-core system using a single processor is currently changed to a multi-core system using a plurality of processors.

One of important processes in the multi-core system is to utilize a performance and a flexibility provided by the multi-core system, and to manage a complexity of a multi-core processor program.

To sufficiently exhibit the performance of the multi-core system, research about multiple cores, for example, a multi-core operating system, a parallel programming model enabling a parallel process, a dynamic execution environment, and the like, is actively conducted.

When driving single application program software in the multi-core system using a functional division, a load distribution may be performed by dividing the application program software into a plurality of functions, and allocating the plurality of functions to multiple cores.

Although functions are divided to make load in each core be equal, the division may be limited due to a different size of load of each function and various factors such as communication between cores. Therefore, it may be impossible to distribute equal load to each core. In addition, an uncertainty occurring in an actual drive may increase a load inequality.

SUMMARY

According to an aspect of one or more embodiments, there may be provided an apparatus for dynamically distributing load, including: a first core; a second core; a function distribution processor to process at least one function, included in an application program, to be distributed to at least one of the first core and the second core; a load monitoring unit to monitor load occurring (current load) in the at least one of the first core and the second core due to the at least one distributed function; and a core decision unit to determine a core to process the at least one distributed function between the first core and the second core, based on the monitored load.

According to another aspect of one or more embodiments, there may be provided a method of dynamically distributing load, including: maintaining a first core; maintaining a second core; processing at least one function, included in an application program, to be distributed to at least one of the first core and the second core; monitoring load occurring in the at least one of the first core and the second core due to the distributed at least one function; and determining a core for processing the distributed at least one function between the first core and the second core, based on the monitored load.

A method of dynamically distributing load, including maintaining a first core; maintaining a second core; distributing at least one function, included in an application program, to the first core and the second core using at least one processor; monitoring current load in the first core and the second core; and determining a core to process the at least one distributed function between the first core and the second core, based on the monitored load.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
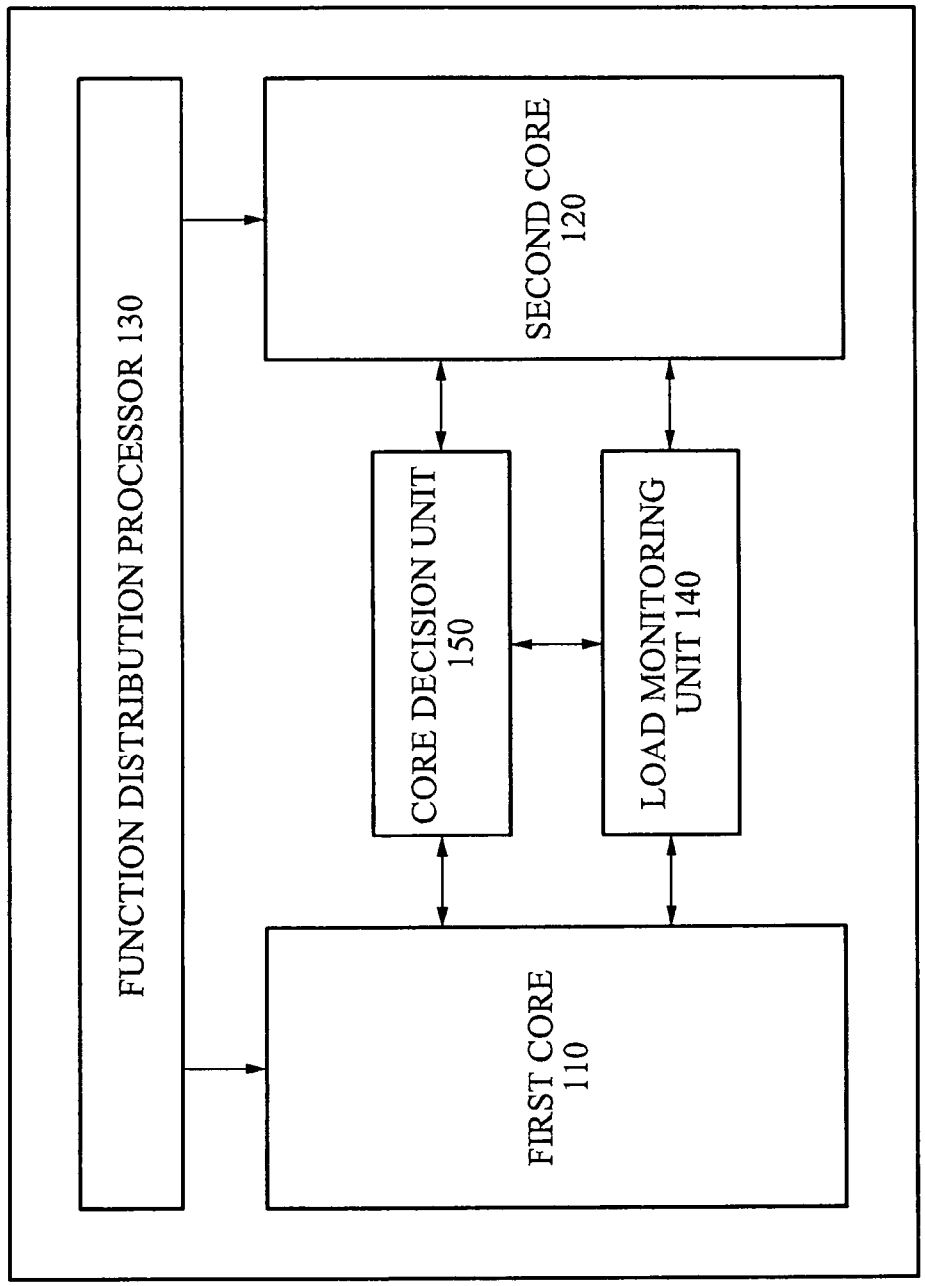
FIG. 1 illustrates an apparatus for dynamically distributing load according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

When it is determined that a detailed description related to a known function or configuration may make the disclosure unnecessarily ambiguous, the detailed description of the known function or configuration will be omitted.

FIG. 1 illustrates an apparatus 100 for dynamically distributing load according to an embodiment.

The dynamic load distributing apparatus 100 may include a first core 110, a second core 120, a function distribution processor 130, a load monitoring unit 140, and a core decision unit 150.

For example, the dynamic load distributing apparatus 100 may be interpreted as a central processing unit (CPU) configured to control an electronic device, or may be interpreted as a form of a module positioned within the CPU.

The dynamic load distributing apparatus 100 may modify a portion of functions, included in an application program, to be performed in an adjacent core as well as in one core.

The dynamic load distributing apparatus 100 may dynamically determine to perform a corresponding function in which core between a current core and an adjacent core, based on information of a status register informing each core status.

Specifically, every time a data unit is processed, the dynamic load distributing apparatus 100 may verify a status of each adjacent core using the status register and the like, and may dynamically determine a core to process a portion of functions among adjacent cores. Accordingly, it is possible to achieve a dynamic load distribution, and to solve a load inequality.

A dual core system may apply the above configuration to an H264 video decoder, and thus may reduce about 80% of an idle time occurring due to a load inequality.

Specifically, the first core 110 and the second core 120 may be used to process data. For ease of description, the dynamic load distributing apparatus 100 is described using two cores in FIG. 1.

The dynamic load distributing apparatus 100 may perform a function of processing an application program. A plurality of functions constituting the application program may be processed in at least one of the first core 110 and the second core 120.

The function distribution processor 130 may determine to distribute the plurality of functions to one or more cores, and process a distribution of the functions.

Specifically, the function distribution processor 130 may process at least one function, included in the application program, to be distributed to at least one of the first core and the second core 120.

As one example, the function distribution processor 130 may distribute a first function set to the first core 110 and distribute a second function set to the second core 120. The first function set may be a portion of the at least one function included in the application program, and the second function set may be another portion thereof.

As another example, the function distribution processor 130 may distribute the first function set to only one of the first core 110 and the second core 120.

The function distribution processor 130 may distribute, to both the first core 110 and the second core 120, the second function set that is not distributed to any one of the first core 110 and the second core 120.

A function set may refer to a group including at least one function.

The function distribution processor 130 may select predetermined functions and equally distribute the selected functions to each of cores.

The function distribution processor 130 may use an importance of each function in manufacturing the application program, load, a type of data processed by a corresponding function, and the like, as a criterion for selecting the functions.

With respect to two functions equally distributed to the first core 110 and the second core 120 by the function distribution processor 130, only one core may be activated and a remaining core may be inactivated.

Specifically, even though the same function is distributed to different cores by the function distribution processor 130, the distributed function may operate in only one core and may not operate in another core.

The function distribution processor 130 may determine at least one of the first function set and the second function set, based on at least one of self-load of the distributed at least one function and an independency of data to be processed.

The load monitoring unit 140 may monitor load occurring (current load) in each core.

Specifically, the load monitoring unit 140 may monitor load occurring in at least one of the first core 110 and the second core 120 due to the distributed at least one function.

For example, the load monitoring unit 140 may monitor the occurring load by verifying a data flow occurring between the first core 110 and the second core 120.

The load monitoring unit 140 may monitor a buffer supporting a data communication between the first core 110 and the second core 120.

Specifically, the load monitoring unit 140 may verify the data flow by verifying the buffer positioned between the first core 110 and the second core 120.

The buffer may perform a function of temporarily maintaining the data flow flowing between the first core 110 and the second flow 120.

When only a flow of data flowing from the first core 110 to the second core 120 is monitored, the load monitoring unit 140 may determine a corresponding function is in an idle status in the second core 120.

The core decision unit 150 may determine a core to process a function distributed to both the first core 110 and the second core 120, based on the monitored result of the load monitoring unit 140.

Specifically, the load monitoring unit 140 may monitor the occurring load by verifying the data flow occurring between the first core 110 and the second core 120, and the core decision unit 150 may determine whether to process the second function set in the first core 110 or the second core 120 based on the verified data flow.

Accordingly, the core decision unit 150 may change a status of a corresponding function set to an active status in the core determined between the first core 110 and the second core 120, and may change the status of the corresponding function set to an inactive status in a remaining core.

For example, when load in the first core 110 is higher than load in the second core 120, a function distributed to the second core 120 in the function distributed to both the first core 110 and the second core 120 may be activated.

The activated function may progress a process of data and progress a predetermined process with respect to predetermined data.

In the case of the first core 110 having high load, an inactive status may be maintained with respect to the same function as the function activated in the second function 120.

Accordingly, in a functional division, even though a portion of functions of the application program is equally distributed to the first core 110 and the second core 120 in an initial stage, the core decision unit 150 may control a corresponding function to be executed in only one core based on load occurring in each of the first core 110 and the second core 120.

According to an embodiment, it is possible to solve a load inequality in a functional division. When functions distributed to cores are actually driven, it is possible to prevent a performance from being deteriorated due to an unequal load distribution.

Figure 2:
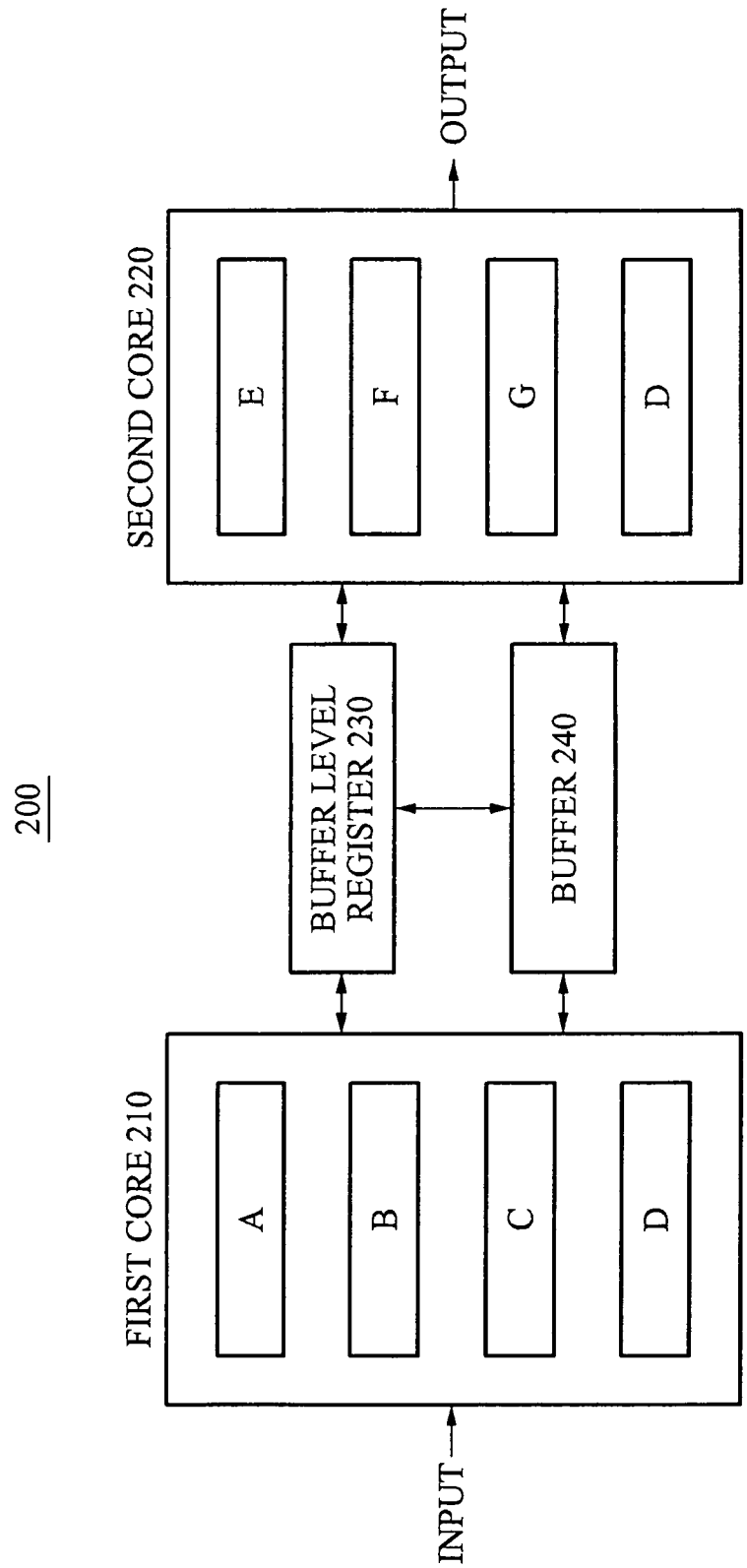
FIG. 2 illustrates an apparatus for dynamically distributing load according to another embodiment.

FIG. 2 illustrates an apparatus 200 for dynamically distributing load according to another embodiment.

Hereinafter, the dynamic load distributing apparatus 200 will be further described with reference to FIGS. 2 and 3 by employing a buffer level register and a buffer as an example of a load monitoring unit. A core decision unit and a function distribution processor are described to operate in a form of software, however, reference numerals are omitted in FIGS. 2 and 3.

As shown in FIG. 2, functions of an application program may be distributed to a first core 210 and a second core 220 by the function distribution processor.

The dynamic load distributing apparatus 200 may distribute functions A, B, and C to the first core 210 among functions A, B, C, D, E, F, and G constituting the application program.

The dynamic load distributing apparatus 200 may distribute the functions E, F, and G to the second core 220.

The dynamic load distributing apparatus 200 may equally distribute the function D to both the first core 210 and the second core 220.

For processing data, the first core 210 and the second core 220 may perform each function and exchange data while performing the corresponding function. Exchange of data may be performed via a buffer 240. A buffer level register 230 may monitor load occurring in the first core 210 and the second core 220 by monitoring the buffer 240.

When the load in the first core 210 is monitored to be relatively high and the load in the second core 220 is monitored to be relatively low, the dynamic load distributing apparatus 200 may dynamically distribute the entire load using the function D distributed to both the first core 210 and the second core 220.

Specifically, the dynamic load distributing apparatus 200 may change a status of the function D of the first core 210 having the relatively high load to an inactive status, and may process corresponding data using the second core 220 having the relatively low load, based on the monitored result. In this instance, since the function D having the same function with respect to data is distributed to the second core 220, the dynamic load distributing apparatus 200 may activate the function D distributed to the second core 220, and use the activated function D for processing of the data.

Figure 3:
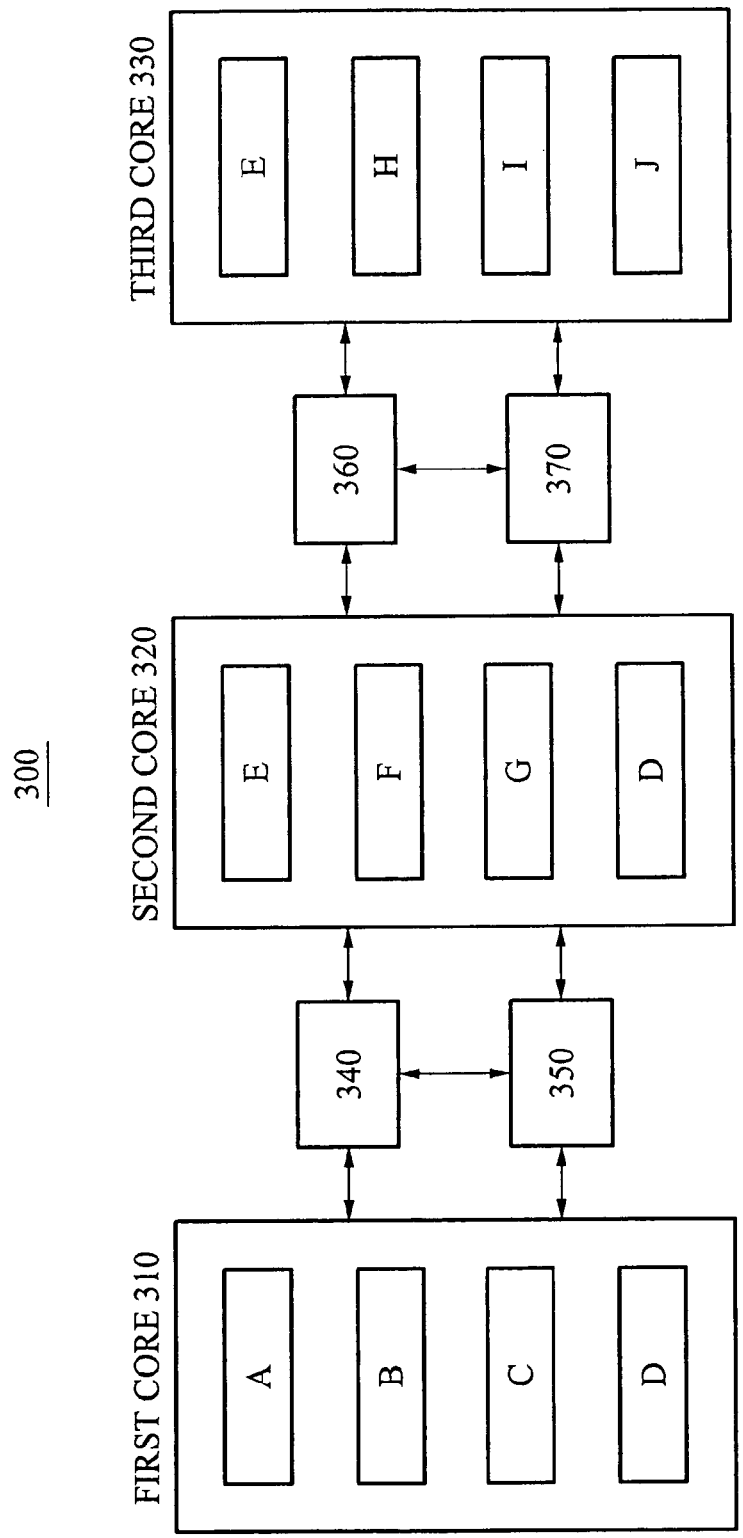
FIG. 3 illustrates an apparatus for dynamically distributing load according to still another embodiment.

FIG. 3 illustrates an apparatus 300 for dynamically distributing load according to still another embodiment.

Although a configuration using only two cores is illustrated in FIG. 2, the dynamic load distributing apparatus 300 according to still another embodiment may effectively distribute load even in a CPU having at least three cores.

For example, the dynamic load distributing apparatus 300 may distribute functions constituting an application program to a first core 310, a second core 320, and a third core 330.

The application program may include functions A, B, C, D, E, F, G, H, I, and J.

The dynamic load distributing apparatus 300 may distribute the functions A, B, C, and D to the first core 310, distribute the functions E, F, G, and D to the second core 320, and distribute the functions E, H, I, and J to the third core 330.

In this instance, each of the functions A, B, C, F, G, H, I, and J may be distributed to only one core, and the functions D and E may be equally distributed to adjacent two cores.

Specifically, the adjacent cores, that is, the first core 310 and the second core 320 may commonly include the function D, and the second core 320 and the third core 330 may commonly include the function E.

A buffer 350 may be positioned between the first core 310 and the second core 320, and a data communication between the first core 310 and the second core 320 may be performed via the buffer 350. As described above, a buffer level register 340 may monitor load occurring in the first core 310 and the second core 320 by monitoring the buffer 350.

Similarly, a buffer 370 may be positioned between the second core 320 and the third core 330, and a data communication between the second core 320 and the third core 330 may be performed via the buffer 370. As described above, a buffer level register 360 may monitor load occurring in the second core 320 and the third core 330 by monitoring the buffer 370.

The dynamic load distributing apparatus 300 may determine in which core to activate a corresponding function with respect to the functions D and E, based on the monitored load.

According to an embodiment, it is possible to effectively use cores by dynamically distributing load, and to reduce a processing time while maintaining a stable service quality by effectively using the cores.

In addition, it is possible to significantly decrease a redundant idle time in each core.

According to an embodiment, the same scheme may be applicable regardless of a dual code and a number of cores, and thus may be readily applicable to a multi-core system having multiple cores.

Figure 4:
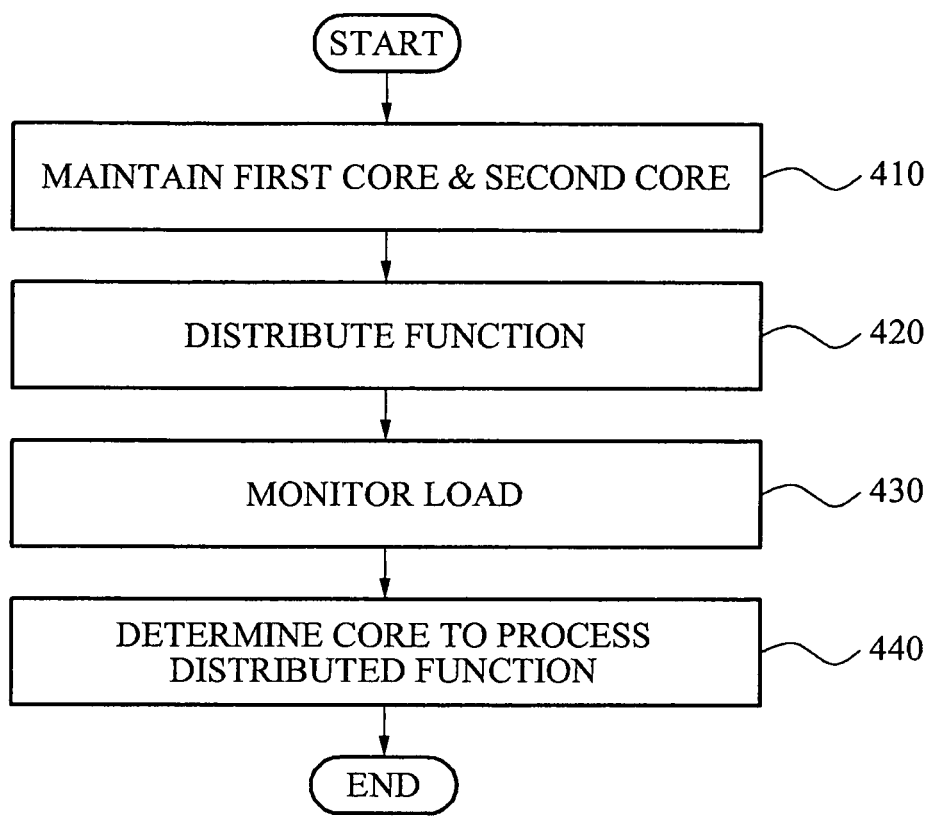
FIG. 4 illustrates a method of dynamically distributing load according to an embodiment.

FIG. 4 illustrates a method of dynamically distributing load according to an embodiment.

In operation 410, the dynamic load distributing method may maintain a first core and a second core.

In operation 420, the dynamic load distributing method may process at least one function included in an application program to be distributed to at least one of the first core and the second core.

For example, the dynamic load distributing method may process a first function set, included in the application program, to be distributed to only one of the first core and the second core.

The dynamic load distributing method may process a second function set, included in the application program, to be distributed to both the first core and the second core.

The dynamic load distributing method may maintain the second function set distributed to both the first core and the second core to be in an active status only in one core, and to be in an inactive status in a remaining core.

In operation 430, the dynamic load distributing method may monitor load occurring in at least one of the first core and the second core due to the distributed at least one function.

In operation 440, the dynamic load distributing method may determine a core to process the distributed at least one function between the first core and the second core, based on the monitored load.

Specifically, the dynamic load distributing method may determine in which core to activate the second function set between the first core and the second core, based on the monitored load.

Accordingly, the dynamic load distributing method may significantly decrease an idle time of a core by dynamically distributing load to cores.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa.

According to embodiments, it is possible to effectively use cores by dynamically distributing load of a function to the cores.

Also, according to embodiments, it is possible to decrease a processing time while maintaining a stable service quality by effectively using cores.

Also, according to embodiments, it is possible to significantly decrease a redundant idle time occurring in each core.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for dynamically distributing load, comprising:
   a first core;
   a second core;
   a function distribution processor to process at least one function, comprised in an application program, to be distributed to at least one of the first core and the second core;
   a load monitoring unit to monitor current load of the at least one of the first core and the second core; and
   a core decision unit to determine a core to process the at least one distributed function between the first core and the second core, based on the monitored current load,
   wherein the load monitoring unit determines the monitored current load by monitoring a current data flow of data exchanged between the first core and the second core, and
   wherein the load monitoring unit monitors the current data flow by monitoring a buffer positioned between the first core and the second core using a buffer level register.

2. The apparatus of claim 1,
   wherein the function distribution processor processes at least a first function set and a second function set, comprised in an application program, distributes the first function set to at least the first core, and distributes the second function set to at least the second core,
   wherein the function distribution processor processes a third function set, comprised in the application program, and distributes the third function set to both the first core and the second core.

3. The apparatus of claim 2, wherein the function distribution processor determines at least one of the first function set and the second function set based on at least one of self-load of the at least one distributed function and an independency of data to be processed.

4. The apparatus of claim 2, wherein:
   the core decision unit determines whether to process the third function set in the first core or the second core based on the current data flow between the first core and the second core.

5. The apparatus of claim 4, wherein the core decision unit changes a status of the third function set to an active status in the determined core between the first core and the second core, and changes the status of the third function set to an inactive status in a remaining core.

6. A method of dynamically distributing load, comprising:
   maintaining a first core;
   maintaining a second core;
   distributing at least one function, comprised in an application program, to the first core and the second core using at least one processor;
   monitoring current load in the first core and the second core; and
   determining a core to process the at least one distributed function between the first core and the second core, based on the monitored current load,
   wherein the monitoring comprises monitoring the current load by monitoring a current data flow of data exchanged between the first core and the second core, and
   wherein the monitoring of the current data flow is implemented by monitoring a buffer positioned between the first core and the second core using a buffer level register.

7. The method of claim 6,
   wherein the distributing comprises distributing at least a first function set to at least a first core and distributing a second function set to at least a second core,
   wherein the first function set and the second function set, comprised in an application program, and
   wherein the distributing further comprises distributing a third function set, comprised in the application program, to both the first core and the second core.

8. The apparatus of claim 2, wherein the buffer positioned between the first core and the second core stores data of the current data flow that flows between the first core and the second core.

9. The apparatus of claim 8,
   wherein the function distribution processor determines that the third function set is to be processed by the second core based on the load monitoring unit determining that data is flowing from the first core to the second core and that no data is flowing from the second core to the first core, and
   wherein the function distribution processor determines that the third function set is to be processed by the first core based on the load monitoring unit determining that data is flowing from the second core to the first core and that no data is flowing from the first core to the second core.

10. The apparatus of claim 4, wherein the load monitoring unit monitors the current data flow between the first core and the second core by monitoring an exchange of data between the first function on the first core and the second function on the second core.

11. The apparatus of claim 1, wherein the core decision unit to dynamically determine the core to perform the at least one distributed function between a current core and an adjacent core, based on information of a status register that informs a status of each core.

* * * * *